UNITED STATES PATENT OFFICE.

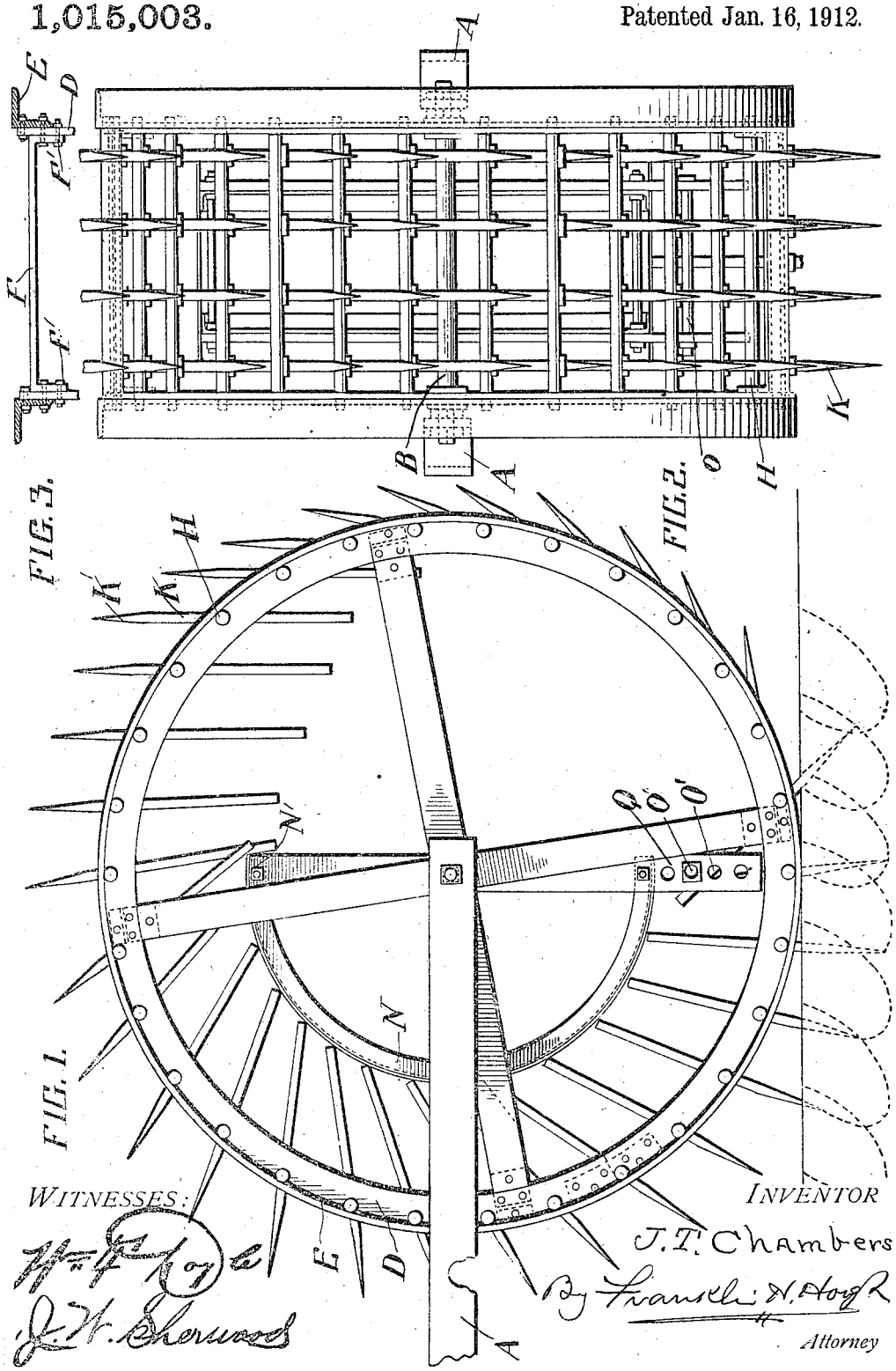

JOHN TAYLOR CHAMBERS, OF NEW ORLEANS, LOUISIANA.

PLOW.

1,015,003.  Specification of Letters Patent.  Patented Jan. 16, 1912.

Application filed August 7, 1911. Serial No. 642,632.

*To all whom it may concern:*

Be it known that I, JOHN T. CHAMBERS, a citizen of the United States, residing at New Orleans, in the parish of Orleans and State of Louisiana, have invented certain new and useful Improvements in Plows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in rotary plows and comprises essentially a rotary cylinder having a series of pivotal pointed rods adapted, as the cylinder rotates, to cause a direct thrust to be imparted to the rods and producing a spading action.

The invention consists further in an apparatus of this nature designed for use as a grubber or as an apparatus for removing roots from vegetation of various kinds of soil.

The invention comprises various details of construction and combinations and arrangements of parts which will be hereinafter fully described and then specifically defined in the appended claim.

I illustrate my invention in the accompanying drawings, in which:—

Figure 1 is a side elevation of my improved rotary plow. Fig. 2 is an edge view, and Fig. 3 is a detail sectional view.

Reference now being had to the details of the drawings by letter, A, A designate the side beams or rails of the plow in which the shaft B of the cylinder is mounted in suitable bearings. Said cylinder comprises a skeleton frame with two circular outlined rims D having circular-outlined angle irons E fastened one to each of said rims and connected by means of the cross rods F having angled ends F' securely bolted to said rims and angle irons. A series of shafts, designated by letter H, are mounted parallel to one another and in said rims at any suitable distances apart, and pivotally mounted upon each of said shafts H is an excavating rod K having a pointed end K' and an integral shank portion projecting inside the rim, as shown clearly in Fig. 1 of the drawings.

Mounted within the cylinder and fixed to the frame is a semi-circular angled bar N, against one end N' of which the inner ends of the shank portions of the various excavating rods are adapted to contact to cause the same to be tilted to the position shown in Fig. 1 of the drawings, so that, when the said points come in contact with the ground, an end thrust will be imparted to the same, causing the points to dig into the ground to a depth from their points to the circumference of the cylinder. A bar O is mounted in one or another of the apertures in the bars Q which are fastened to the frame of the apparatus, said rod being adapted to be held in any one or another of the apertures O' for the purpose of causing the excavating points to be tilted at different inclinations for the purpose of effecting a spading action after the points have been passed directly underneath the axis of the cylinder.

The operation of my invention will be readily understood and is as follows:— When the same is moved forward by any suitable traction power over the surface of the ground, the various points will be thrown to operative positions as the inner ends of the shank portions thereof strike against the upper end of the curved angled bar N and held in operative positions while the cylinder makes a half revolution. As the points come directly underneath the axle, the inner end of the excavating point will be turned, thus causing the spading action and throwing up the dirt in the manner illustrated in Fig. 1.

From the foregoing, it will be noted that, by the provision of an apparatus as shown and described, the points may be automatically thrown to opposite positions and affording an efficient means for grubbing and producing spading action for various purposes.

What I claim to be new is:—

A rotary plow comprising a cylinder, a frame in which the same is mounted, a series of pointed excavating members pivotally mounted upon the cylinder, means for throwing the points into positions to give end thrusts thereto as the cylinder rotates, bars fastened to the frame and provided with registering apertures, a rod adjustably mounted in said apertures in the paths of the inner ends of the pointed excavating members.

In testimony whereof I hereunto affix my signature in the presence of two witnesses

JOHN TAYLOR CHAMBERS.

Witnesses:
P. S. MORRIS, Jr.,
W. E. JONES.